United States Patent [19]

Beene

[11] 4,343,971
[45] Aug. 10, 1982

[54] SUBSCRIBER DROP CIRCUIT FOR CONTROLLING DROP CURRENT WITH LOAD AND MAXIMIZING POWER USAGE

[75] Inventor: Gerald W. Beene, Arlington, Tex.

[73] Assignee: Reliance Electric Company, Cleveland, Ohio

[21] Appl. No.: 234,711

[22] Filed: Feb. 17, 1981

[51] Int. Cl.³ .......................................... H04M 19/00
[52] U.S. Cl. .................................. 179/70; 179/16 F; 179/18 FA
[58] Field of Search ............ 179/70, 77, 18 FA, 18 F, 179/16 F, 16 AA, 2.51

[56] References Cited

U.S. PATENT DOCUMENTS

| 4,140,881 | 2/1979 | Clenney | 179/16 F |
| 4,143,247 | 3/1979 | Yoshitoshi et al. | 179/16 F |
| 4,254,305 | 3/1981 | Treiber | 179/18 FA |
| 4,273,963 | 6/1981 | Seidel | 179/16 F |
| 4,282,407 | 8/1981 | Steifel | 179/16 F |

FOREIGN PATENT DOCUMENTS

2209593  9/1973  Fed. Rep. of Germany .... 179/16 F

Primary Examiner—Gerald L. Brigance
Attorney, Agent, or Firm—Michael M. Rickin; Roy F. Hollander

[57] ABSTRACT

A circuit for supplying drop current to the subscriber connected to the remote terminal of a central office powered telecommunications system. A switching regulator is included in the circuit for generating the drop current. The switching regulator adjusts its conduction time as a function of the length of the loop connecting the subscriber to the terminal such that the subscriber consumes only that power required by the loop length. The switching regulator operates in response to a reference current generated by a control circuit. A central office supplied signal on the transmission means connecting the central office to the terminal is used for transferring power to the terminal. The amplitude of that signal at the terminal varies with system load. When that amplitude deviates in a predetermined direction from a reference signal of predetermined amplitude the reference current and therefore the drop current to all off hook subscribers is uniformly decreased by an amount which allows the power transferring signal amplitude to be maintained substantially equal to the amplitude of the reference signal.

20 Claims, 5 Drawing Figures

SUBSCRIBER DROP CIRCUIT FOR CONTROLLING DROP CURRENT WITH LOAD AND MAXIMIZING POWER USAGE

BACKGROUND OF THE INVENTION

1. Field of the Invention

This invention relates to the providing of drop current to the subscribers served by a remote terminal of a telecommunications system and more particularly to the control of the subscriber drop current with both load and loop length in a system where the remote terminal is powered from the system's central office.

2. Description of the Prior Art

In many telecommunication systems such as multichannel analog or digital subscriber carrier systems or remote switches or concentrators for example a multiplicity of subscribers located at one or more terminals remote from the central office are serviced by the system. Each of the subscribers have their telephones connected to the associated terminal through a DC loop. The terminal places a predetermined voltage across the subscriber's telephone. When the telephone goes off hook a predetermined current will flow in the loop connecting the telephone to the terminal. A voltage drop will occur in that loop which will depend upon the resistance of the telephone which is substantially fixed and the length of the loop. Therefore the voltage drop in a long loop, that is a telephone located far from the terminal will be substantially larger than the voltage drop in a short loop.

As more of the subscribers serviced by the terminal come off hook an increasing load is placed upon the power circuitry located in that terminal. The terminal must maintain the predetermined voltage and also provide the predetermined current to each of the subscribers. Where the system is of the type wherein the remote terminals are connected to a local source of ac power the meeting of the power requirements for increased load is not difficult. On the other hand the system may be of the type wherein the power for the remote terminals is obtained from the central office. One such central office powered multichannel digital subscriber carrier system is described in copending U.S. patent application Ser. No. 234,894 entitled "A Central Office Powered Digital Subscriber Carrier System" based on the inventions of Gerald Beene et al and filed of even date herewith. In such central office powered systems the amount of power available at the remote terminal is limited. As more of the subscribers connected to that remote terminal come off hook an increased load is placed on the terminal. This load causes the voltage at the input to the terminal to decrease.

The remote terminal generates from the power supplied by the central office the necessary voltages to run the electronics at the terminal and also the predetermined voltage to be placed across each subscriber loop. As the load at the terminal increases and the voltage at the input to the terminal decreases, the power supply at the terminal will find it increasingly more difficult to maintain these voltages. If as a result of decreasing input voltage at the terminal the power supply located therein decreases the voltages it generates the terminal electronics may not operate properly. Improper operation of the electronics could cause the terminal to malfunction and terminate service to the subscribers thereto. In this manner service to the subscribers connected to the terminal would be impaired.

It was then recognized that it would be far more desirable in a central office powered system to maintain the input voltage to the terminal at some minimum acceptable level as more of the subscribers connected to that terminal came off hook. It was further recognized that as conventional drop circuitry operates at a constant voltage and a constant current independent of the length of the loop thereby resulting in a substantial waste of power particularly on short loops it would also be desirable to provide drop circuitry which substantially eliminates this waste of power. Until the present invention no such technique or circuitry was known which would produce these results.

The drop circuitry of the present invention provides for a drop current to the subscriber which is generated by a circuit whose operation is controlled as a function of the length of the loop connecting the subscriber to the terminal. Controlling the generation of the drop current in this manner allows the limited power available at the terminal to be used efficiently with a minimum waste of power. Also included in the drop circuitry is a circuit for decreasing the drop current to all of the off hook subscribers equally whenever the input voltage to the terminal falls below the minimum acceptable level. This level is typically set at that voltage which will insure maximum power transfer from the cable pairs, which connect the terminal to the central office, to the terminal.

SUMMARY OF THE INVENTION

In accordance with the present invention there is provided a subscriber drop circuit for the remote terminal of a central office powered telecommunications system. Included in the drop circuit are a switching regulator which operates as a function of drop loop length to generate the drop current. A comparator compares a triangular wave form having a d-c level determined by the drop current to a signal proportional to a reference current representing a predetermined drop current. Whenever the reference signal exceeds the triangular wave form the switching transistor in the switching regulator is turned off for that portion of the switching cycle.

Also included in the drop circuit is circuitry for decreasing the drop current to all the off hook subscribers whenever the voltage present on the transmission line at the input to the remote terminal falls below a predetermined reference voltage. An error amplifier generates a signal whose amplitude is a function of the amount by which the terminal input voltage falls below the reference voltage. This signal is used to drive a circuit for generating the current(s) for the subscriber(s) served by the terminal. The current(s) so generated represent the value of current to which the drop current will be reduced in order to maintain the terminal input voltage equal to the predetermined reference voltage.

DESCRIPTION OF THE DRAWING

FIG. 5(a) to (d) are wave forms illustrating the operation of the switching regulator for both short and long loops.

DESCRIPTION OF THE PREFERRED EMBODIMENT

Figure 1:
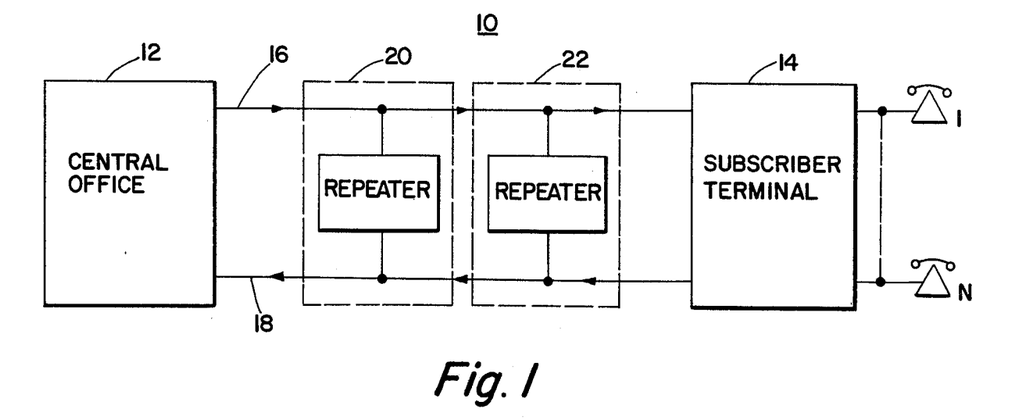
FIG. 1 is a block diagram of one type of central office powered telecommunications system for serving subscribers.

Referring to FIG. 1 there is shown a typical multichannel pulse code modulation subscriber carrier system 10 for transmitting signals between a central office 12 and a terminal 14 where a multiplicity of subscribers serviced by the system are located. Message signals to be transmitted from central office 12 to subscriber terminal 14 leave the office by outgoing transmission cable pair 16. Message signals to be transmitted from the subscribers at terminal 14 to the central office leave the terminal by incoming transmission cable pair 18. Where system 10 is used to provide service to telephone subscribers the message signals will typically consist of speech samples and signalling information. Where system 10 is used to provide service to other types of subscribers the message signals will consist of various other forms of binary encoded information such as data. The terms "outgoing" and "incoming" are defined with respect to the central office.

Interposed in the cable pair 16 and 18 between central office 12 and subscriber terminal 14 are repeater locations 20 and 22. While there are two repeater locations shown in FIG. 1 it should be appreciated that the actual number of such locations between central office 12 and subscriber terminal 14 will depend on the distance that the terminal is from the central office and the gauge of the cable used in transmission pairs 16 and 18. Each of the locations 20 and 22 are identical and include a conventional digital type minirepeater which may for example be the repeaters available from manufacturers such as ITT, Lynch Communications Systems or Wescom Inc.

Connected to terminal 14 are the subscribers serviced by the system. For purposes of description it is assumed that system 10 is providing service to telephone subscribers. Terminal 14 would typically include its own repeater. If the design of the terminal is such that no repeater can be included therein then the terminal would then be located either at or close to the repeater at location 22 as the repeater provides certain functions such as line buildout for the terminal. In the system shown in FIG. 1 there are N subscribers each of whose telephones are connected to terminal 14 by a local DC loop. Terminal 14 provides the powering for the subscriber's telephone. This power is provided in the form of a predetermined voltage typically in the order of minus 27 volts and when the associated telephone goes off hook a predetermined constant current typically in the order of 23 MA.

System 10 is of the type wherein power for the subscriber terminal is provided from the central office over the conductors of cable pairs 16 and 18. One such system is described in the aforementioned U.S. patent application Ser. No. 234,894. In the system described therein the central office places a high voltage of one polarity on both conductors of cable pair 16 and a high voltage of equal magnitude and opposite polarity on both conductors of cable pair 18. Each of the conventional repeaters present at locations 20 and 22 are connected in shunt with cable pairs 16 and 18 for the purposes of powering and in series therewith for the purposes of signal regeneration. Each of the repeaters act as constant power devices with substantially minimal voltage drop occurring across each repeater.

A voltage therefore appears on the cable pairs at the input terminals to subscriber terminal 14. This voltage is lower in magnitude than the magnitude of the voltage placed on the pairs by the central office due to the voltage drop caused by the resistance of the pairs and the current flowing therein. The current flowing in the pairs is a function of system load and increases as more subscribers come off hook and load increases. A conventional switching power supply located in terminal 14 utilizes the voltage appearing at the input thereof to generate the regulated voltages for operation of the electronics in terminal 14 and in addition generates the minus 27 volts for the subscriber loops. Thus terminal 14 provides from the power received from the central office the predetermined voltage for operating the subscribers telephones.

When a subscriber connected to terminal 14 places his telephone off hook the predetermined constant current flows in the loop connecting the subscribers telephone to the terminal. As more of the subscribers connected to terminal 14 come off hook the power supply in the terminal must provide the constant current to each of the subscribers. The voltage present at the input to subscriber terminal 14 is, as described previously, dependent on the length of the system and also on the system load. As more of the subscribers connected to terminal 14 come off hook, the load on the system increases thereby decreasing the voltage at the input to the terminal. In those systems where the load is sufficiently high the voltage at the input to terminal 14 will fall below a predetermined minimum acceptable level. This predetermined level is that voltage which will allow maximum power transfer from the transmission line to the load.

There is, however, circuitry included in terminal 14 to be described in detail in connection with FIGS. 2, 3, 4 and 5 which as the voltage at the input to the terminal falls below the predetermined minimum acceptable level decreases the current to each of the off hook subscribers to thereby bring the voltage at the terminal input back to the acceptable level.

There is also circuitry included in terminal 14 which controls the drop current to each of the subscribers such that the power lost on those loops connecting subscribers who are close to the terminal (hereinafter referred to as "short loops") is less than the power lost for conventional drop circuitry. In such conventional drop circuitry each subscriber independent of how short the loop is, consumes a predetermined amount of power. This circuitry will also be described in detail in connection with FIGS. 2, 3, 4 and 5. Thus, terminal 14 includes circuitry for controlling the power required by each subscriber as a function of subscriber drop loop length and also includes circuitry for controlling the drop current as a function of system load.

Figure 2:
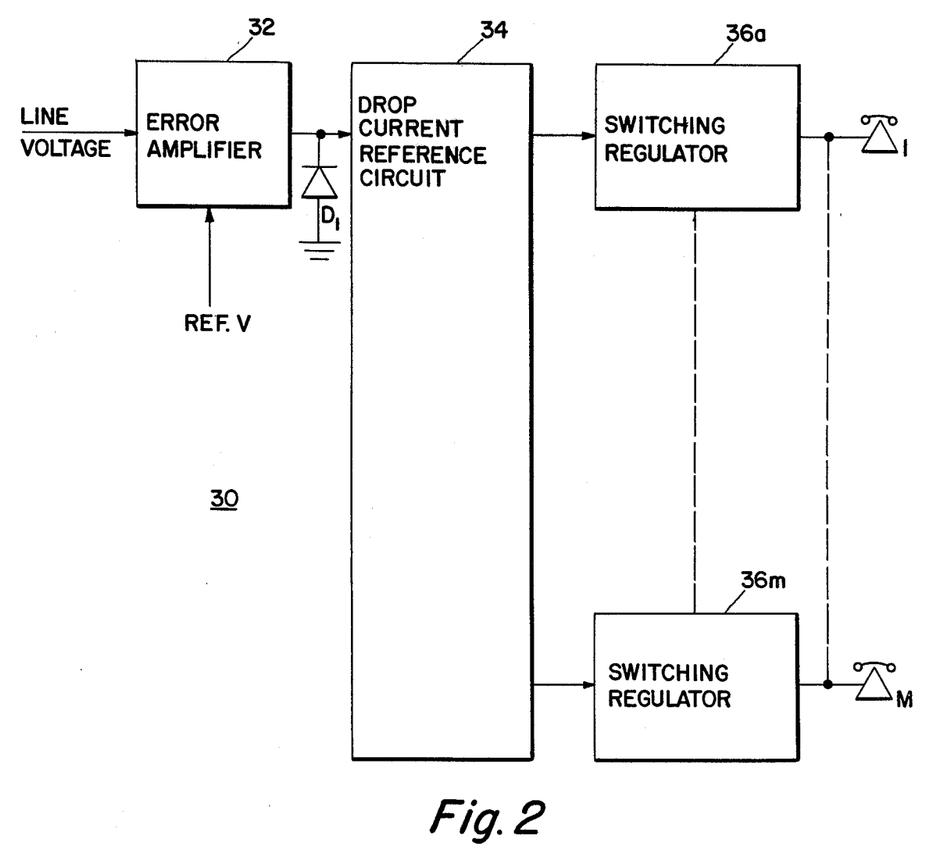
FIG. 2 is a block-schematic diagram of a subscriber drop circuit according to the present invention.

Referring to FIG. 2 there is shown a block diagram of the circuit 30 located in subscriber terminal 14 which is used to control the drop current to the subscribers as a function of the voltage appearing at the input to the subscriber terminal and control the power required by each subscriber as a function of the length of the loop connecting the subscriber to the terminal. Circuit 30 includes an error amplifier 32 which is used to compare the line voltage to a predetermined reference voltage and generate an output signal whenever the line voltage falls below the reference voltage. Circuit 32 may for example be comprised of an operational amplifier whose inverting terminal receives a voltage proportional to the line voltage and whose noninverting terminal receives the reference voltage. The operational amplifier may be of the high gain type such that a small change in line voltage allows the error amplifier to cover its entire range of output signal. The voltage proportional to the line voltage may for example be generated by the combination of a chopper, a transformer, a diode and a capacitor. The chopper provides from the d-c voltage on the transmission pairs an a-c voltage to the primary of the transformer. Therefore there appears across the secondary of the transformer an a-c voltage which is proportional to the line voltage. The diode and the capacitor act as a peak detector to provide a d-c voltage proportional to the line voltage. Of course a resistor divider may be used to generate a d-c voltage proportional to the line voltage, but a transformer is used where isolation is desired. Thus error amplifier 32 functions to generate an output signal whenever the line voltage falls below a predetermined reference voltage.

Figure 3:
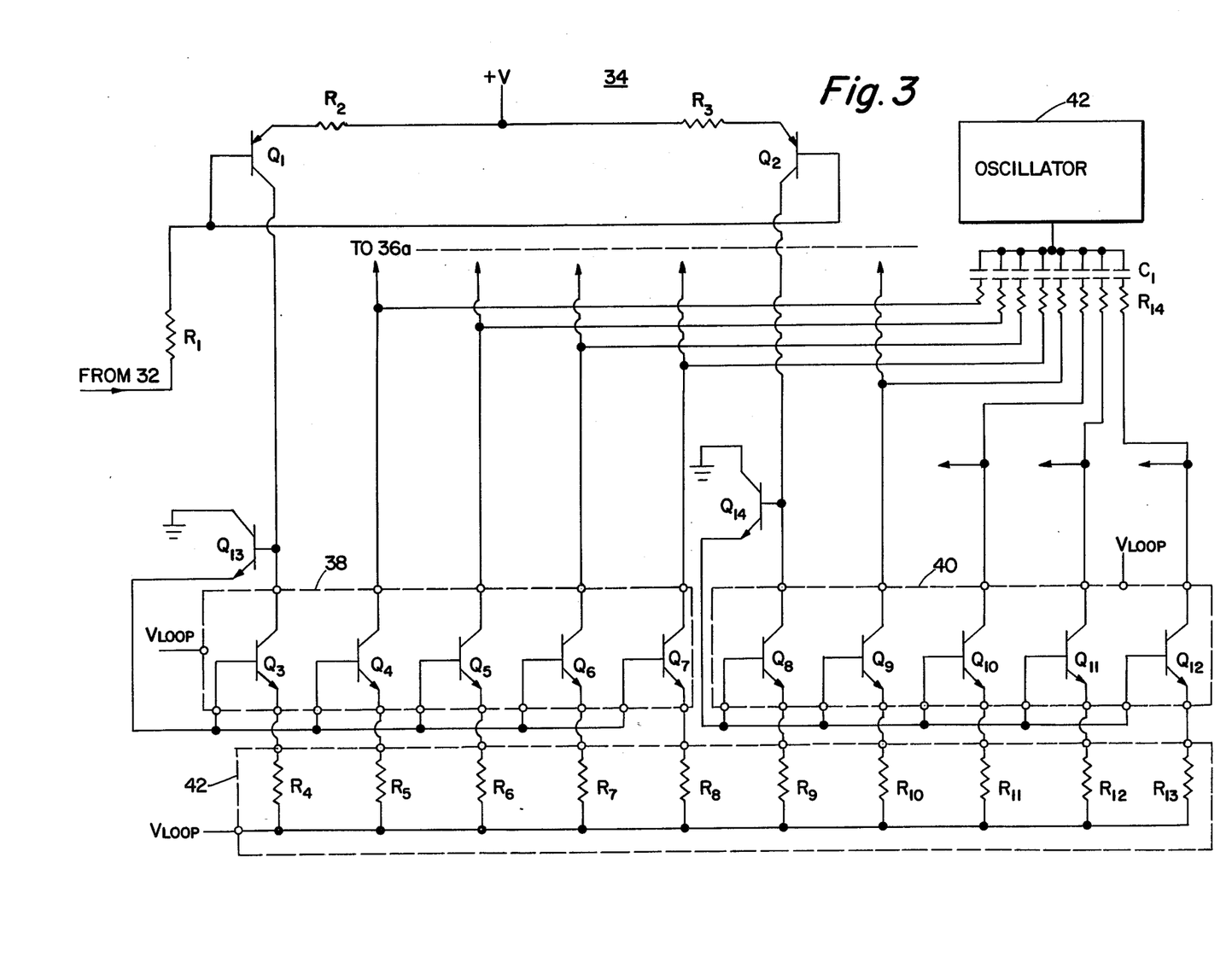
FIG. 3 is a schematic diagram which illustrates one embodiment of the drop reference current circuit shown in FIG. 2.

The output of amplifier circuit 32 is connected by a diode D1, poled as shown, to the input to drop current reference circuit 34. Diode D1 may be considered to be part of circuit 32 but has been shown in FIG. 2 separate therefrom as it performs a compensating function for various ones of the transistors comprising circuit 34. A detailed circuit schematic for circuit 34 is shown in FIG. 3 to be described hereinafter. In response to the output of comparator 32, circuit 34 functions to generate a signal which will result in the drop current to those subscribers currently off hook to be decreased by an amount which will allow the line voltage to rise back up to the level of the reference voltage.

The signal generated by circuit 34 is used to control the drop current to the subscribers connected to terminal 14. For the multichannel digital subscriber carrier system shown in FIG. 1 there are N subscribers serviced by terminal 14. Each subscriber is assigned a channel and therefore the system shown in FIG. 1 may be said to be an N channel system. For digital subscriber carrier systems currently in use in North America the number of subscribers and therefore the number of channels serviced by the system has been set at 24. Thus for the system shown in FIG. 1 it is assumed that there are 24 subscribers serviced by terminal 14.

Circuit 34 could control the drop current for all of the 24 subscribers simultaneously. It has however been found convenient for circuit 34 to control the drop current for less than all of the subscribers serviced by the system. As shown in FIG. 2 circuit 34 controls the drop current for M of the N subscribers serviced by the system 10. Circuit 34 controls the drop current for the M subscribers through the use of the M switching regulators designated as 36A to 36M in FIG. 2. When only a small number of subscribers are off hook the load on terminal 14 will be low and the line voltage will therefore be greater than the reference voltage. For this condition the associated switching regulator circuit 36 will generate a constant current typically in the order of 23 MA to each of the off hook subscribers. As will be described in more detail hereinafter the switching regulator circuit 36 controls the power required by each subscriber as a function of the length of the loop connecting the subscriber to terminal 14. The switching regulator functions to allow more efficient power transfer between the terminal and the subscriber for both short and long loops.

As more of the subscribers connected to terminal 14 come off hook the load at the input of subscriber terminal 14 increases thereby decreasing the line voltage. When the line voltage drops below the reference voltage, circuits 32 and 34 control the operation of the switching regulators 36A to 36M to thereby decrease the current to each of the off hook subscribers. The current is decreased by the same amount to each of the off hook subscribers and the decrease is sufficient to reduce the load and thereby allow the line voltage to become equal to the predetermined reference voltage. The predetermined reference voltage is that voltage which will allow maximum power transfer from the cable pairs 16, 18 to the terminal 14.

Figure 4:
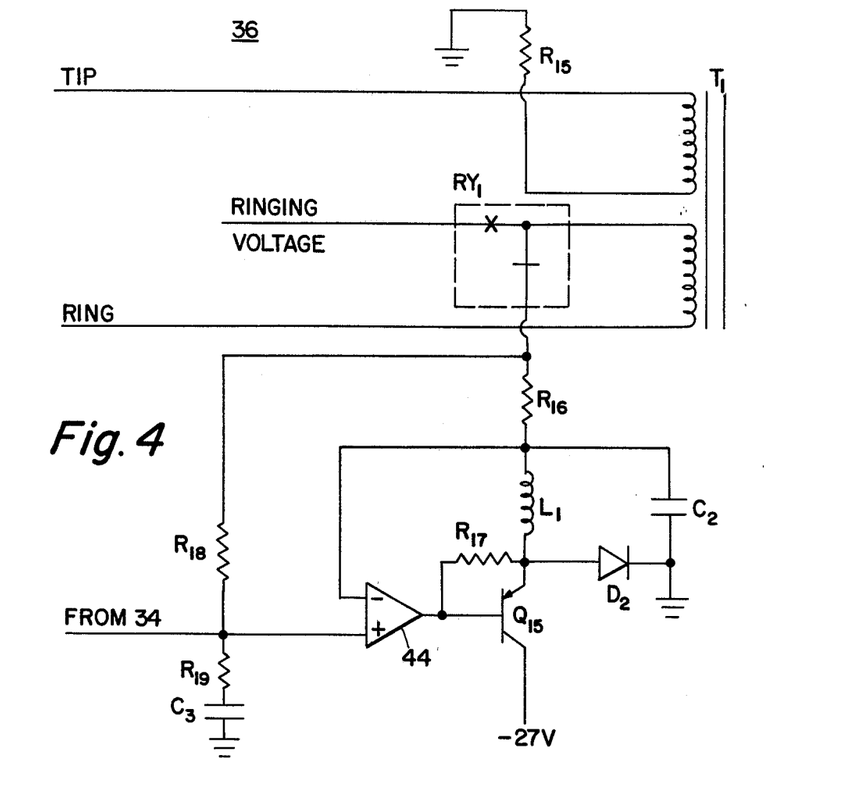
FIG. 4 is a schematic diagram which illustrates one embodiment of the switching regulator circuit shown in FIG. 2.

As described above, reference circuit 34 controls less than all of the subscribers connected to terminal 14. For a typical 24 channel subscriber carrier system it has been found convenient for reference circuit 34 to control the loop current to eight of those subscribers. Thus for such a system the output of error amplifier 32 would also be connected to two additional reference circuits which are identical to circuit 34. These additional reference circuits would each also control the drop current to eight subscribers. Each of these circuits would have eight switching regulator circuits 36 identical to regulators 36A to 36M connected thereto. Thus in the 24 channel digital subscriber carrier system where the subscribers are grouped together in groups of eight, there are three drop current reference circuits 34 each of which control the drop current to eight subscribers through eight associated switching regulator circuits 36. A detailed schematic diagram for the switching regulator circuit is shown in FIG. 4 to be described hereinafter.

Referring to FIG. 3 there is shown a detailed schematic diagram for drop current reference circuit 34. For simplicity of description it is assumed that the circuit shown in FIG. 3 controls the drop current of eight of the subscribers connected to terminal 14. When the line voltage falls below the reference voltage the output of comparator circuit 32 goes high and appears at the junction of diode D1 (shown in FIG. 2) and the input to circuit 34. By resistor R1 the input signal to circuit 34 is connected to the bases of transistors Q1 and Q2. The emitters of these transistors are connected by resistors R2 and R3 to a source of positive voltage typically in the order of six volts. Transistors Q1 and Q2 establish a reference current into current mirror circuits 38 and 40. Diode D1 functions when the line voltage is above the reference voltage to cancel out the base emitter drop of transistors Q1 and Q2 to thereby keep the input signal constant and independent of temperature. When the output of circuit 32 goes high diode D1 is cutoff. Circuits 38 and 40 establish in total eight substantially equal reference currents which are connected to the eight switching regulator circuits 36.

Current mirror circuit 38 includes input transistor Q3 whose collector is connected to the collector of transistor Q1 and transistors Q4 to Q7 for generating four substantially equal reference currents. Transistor Q13 having its base connected to ground and its emitter connected to the base of transistors Q3 to Q7 acts as an emitter follower to drive transistors Q3 to Q7 and prevent the collector of Q3 from being loaded. Current mirror circuit 40 includes input transistor Q8 whose collector is connected to the collector of transistor Q2 and transistors Q9 to Q12 for generating four substantially equal reference currents. Transistor Q14 having its base connected to the collectors of transistors Q2 and Q8, its collector connected to ground and its emitter connected to the bases of transistors Q8 to Q12 acts as an emitter follower to drive transistors Q8 to Q12 and prevent the collector of Q8 from being loaded. Connected to the emitters of transistors Q3 to Q7 in current mirror circuit 38 and to the emitters of transistors Q8 to Q12 in current mirror circuit 40 are resistors R4 to R13 which are equal in resistance. The amplitude of the reference current generated by current mirror circuits 38 and 40 is dependent upon the input signal received by transistors Q1 and Q2 from the output of comparator circuit 32.

As described above the collectors of transistors Q4 to Q7 and Q9 to Q12 are connected to an associated one of the eight switching regulator circuit 36. Also connected to the collectors of transistors Q4 to Q7 and Q9 to Q12 and therefore to the input of each of the switching regulators is the output of oscillator 42. Oscillator 42 provides the high frequency triangular shaped waveform which is used in each of the switching regulators 36 as will be described hereinafter. This triangular shaped waveform may for example have a frequency in the order of 64 kHz and an amplitude of 6 volts peak to peak and may be generated by one or more suitably arranged operational amplifiers. Oscillator 42 also includes the series combination of eight capacitors (each designated C1 in FIG. 3) and eight resistors (each designated as R14) for coupling the triangular shaped waveform to the collectors of transistors Q4 to Q7 and Q9 to Q12.

When system 10 is lightly loaded the line voltage present at the input to error amplifier 32 is above the reference voltage and the output of circuit 32 is low. The reference current generated by circuit 34 should therefore be that value of current which causes the drop current under light load conditions to be in the order of 23 Ma. It has been found desirable to set the reference current generated by circuit 34 to a value which is substantially below 23 Ma. Setting the reference current to the lower value allows the current mirror circuits 38 and 40 to function properly and also decreases the amount of power consumed by circuit 34. The reference current should not, however, be set to a value which is so low that the reference current would become lost in any noise signals present in circuit 34. In a typical circuit 34 constructed in accordance with the present invention the resistors R1 to R14 were selected to have the following resistance in ohms:

R1 = 1000
R2 = R3 = 27.4 × 10$^3$
R4 to R13 = 330 each
R14 = 4700 each

The reference current under lightly loaded conditions was selected to be 1/100th of the desired drop current or 230 microamperes.

As system 10 becomes more heavily loaded the voltage present on the cable pairs at the input to terminal 14 decreases. The output of circuit 32 starts to rise as soon as the input voltage falls below the reference voltage. The more the input voltage falls below the reference voltage the higher the output of circuit 32 becomes. As the output of circuit 32 rises the reference circuit generated by circuit 34 drops below the lightly loaded value. The higher the output of circuit 32 becomes the further the reference current drops below the lightly loaded value. For the typical circuit 34 described above the reference current is always 1/100th of the resulting drop current.

Referring to FIG. 4 there is shown a detailed schematic diagram for switching regulator 36. As each of regulator circuits 36A to 36M shown in FIG. 2 are identical only one such circuit need to be described. Switching regulator circuit 36 functions in response to the signals generated by circuit 34 to control the drop current to its associated subscriber telephone, in a manner such that power usage on both short and long loops is maximized. The value of drop current which is controlled by circuit 36 is determined by the value of reference current set by circuit 34. Circuit 36 controls the drop current by controlling the conduction time of the switching regulator as a function of the length of the subscriber loop. The function of circuit 36 will now be described in detail.

Assume initially that none of the subscribers connected to terminal 14 have their associated telephones off hook. Terminal 14 therefore places across the tip and ring connectors of the DC loop connecting the subscriber to the terminal a predetermined loop voltage typically in the order of minus 27 volts. Assume one of the subscribers now goes off hook completing the circuit between its associated tip and ring conductors. The resistance of that circuit and therefore the DC loop will depend on the resistance of the subscribers telephone (which is substantially fixed) and the length of the loop connecting the subscriber to terminal 14. If the subscriber is relatively close to terminal 14 the total resistance of its associated DC loop will be slightly greater than the resistance of the subscriber's telephone. If the subscriber is relatively far from terminal 14 the total resistance of its associated DC loop will be substantially greater than the resistance of the subscriber's telephone. In either case an initial current will flow in the DC loop dependent upon the loop voltage and loop resistance. For the close in subscriber this initial current will be substantially greater than the current ordinarily needed to provide service to the subscriber. For the relatively far away subscriber this initial current will be substantially closer to the current needed in the DC loop to provide service to that subscriber. The current which flows in the DC loop to provide service to a subscriber under light load conditions at terminal 14 is typically in the order of 23 MA.

Circuit 36 functions to adjust the power in the DC loop of its associated subscriber to the value needed to provide service to that subscriber. Circuit 36 accomplishes this function by controlling the conduction time of transistor Q15. The transistor's conduction time is controlled by the output of comparator 44. When the associated subscriber is on hook transistor Q15 conducts all the time. When the associated subscriber goes off hook and completes the circuit a DC loop current flows from ground through a resistor R15 to the tip conductor of that loop. The current flows through the subscriber's phone and into the ring conductor of the loop to thereby appear by the operation of resistor R16 as a voltage of the inverting input of comparator 44. Transformer T1 only the primary windings of which are shown in FIG. 4 provides a balanced interface with the subscriber drop. Simultaneously therewith the reference current from circuit 34 flows through resistor R18 and therefore a reference voltage appears at the non-inverting input of comparator 44. As the amplitude of the reference current depends on the number of subscribers served by circuit 34 who are off hook at any one time the reference voltage will also vary with load.

Also appearing at the non-inverting input of comparator 44 is the triangular shaped waveform generated by oscillator 42 of circuit 34. The amplitude of the triangular waveform is reduced by the voltage divider action of resistors R14 of FIG. 3 and R19. The triangular waveform rides on a d-c level which is a function of the voltage developed by the drop current across resistor R16.

Figure 5:
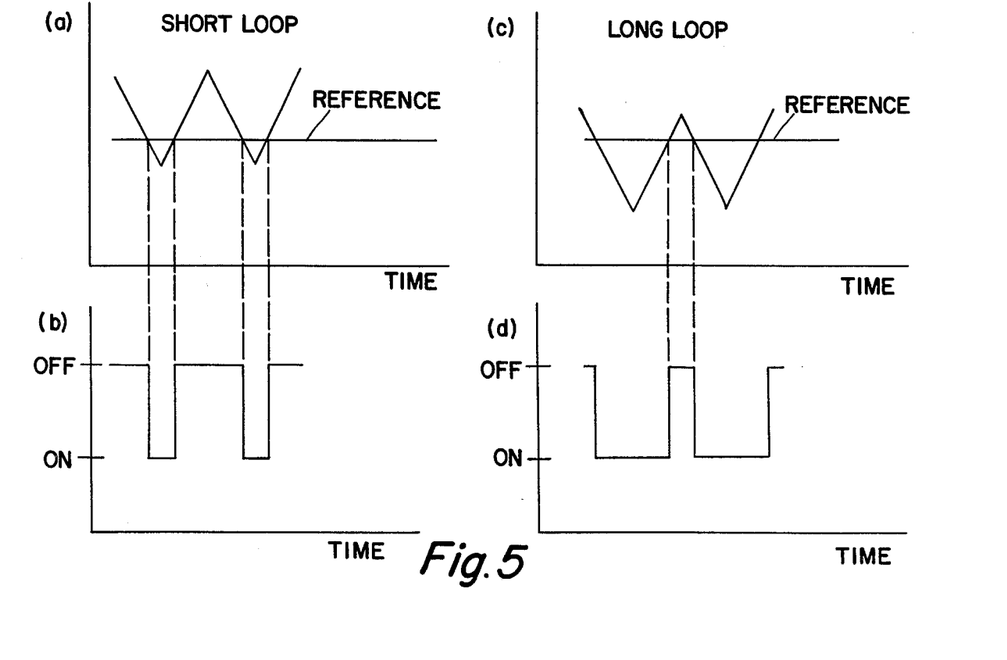

Referring to FIG. 5 there are shown waveforms which illustrate the triangular waveform, the reference and the conduction time of transistor Q15 for both a short loop and a long loop FIG. 5(a) illustrates the triangular waveform and the reference and FIG. 5(b) illustrates the conduction time of the transistor for a short loop. FIG. 5(c) illustrates the triangular waveform and the reference and FIG. 5(d) illustrates the conduction time of the transistor for a long loop.

Assume that only one of the eight subscribers served by circuit 34 is off hook. Comparator 44 controls the conduction time of transistor Q15 in a manner such that the voltage at the comparator's inverting input terminal is made equal to the voltage at the comparator's noninverting input terminal. Before the subscriber went off hook transistor Q15 conducted all the time. As soon as the subscriber goes off hook, loop current flows to that subscriber dependent on the resistance of the subscriber's loop. The loop current generates a voltage at the inverting input terminal of comparator 44. If the loop current was greater than the 23 milliamperes needed to maintain service to the subscriber the voltage at the comparator's inverting input terminal would be substantially greater than the reference voltage at the compartor's non-inverting input terminal. By controlling the conduction time of transistor Q15 the amount of current flowing in the loop and therefore the voltage at the inverting input terminal of the comparator will be reduced in a manner such that transistor Q15 will conduct for only that time necessary to make the average voltages at the comparator's inputs equal to each other.

If the subscriber is connected to terminal 14 by a short loop the drop current which initially flows in the loop is quite high as compared to the desired drop current. As shown in FIG. 5(a) the triangular waveform which rides on the voltage developed by the drop current across resistor R16 intercepts the reference voltage only in the vicinity of the waveform's negative going peak. As the loop is short transistor Q15 need only conduct for a short period of time during each cycle of the triangular waveform in order to generate the loop current which will make the voltages at the comparator's inputs equal to each other. FIG. 5(b) shows the portion of time during each cycle for which transistor Q15 conducts for a short loop.

If the subscriber is connected to terminal 14 by a long loop the drop current which initially flows in the loop is quite low and is very close to the desired drop current. As shown in FIG. 5(c) the triangular waveform which rides on the voltage developed by the drop current across resistor R16 intercepts the reference voltage only in the vicinity of the waveform's positive going peak. As the loop is long transistor Q15 must conduct for a long period of time during each cycle of the triangular waveform in order to generate the loop current which will make the voltages at the comparators inputs equal to each other. FIG. 5(d) shows the portion of time during each cycle for which transistor Q15 conducts for a long loop.

The collector of transistor Q15 is connected to the predetermined d-c voltage for the drop of $-27$ V. Diode D2 connected between the emitter of Q15 and ground and poled as shown acts as a rectifier. Inductor L1 acts as an energy storage inductor. Transistor Q15, inductor L1 and diode D2 act in combination to generate the desired drop current from the $-27$ V. Resistor R17 aids in turning transistor Q15 off.

Representative component values for the resistors, inductor and capacitors comprising circuit 36 constructed according to the present invention are given below:

| | |
|---|---|
| R15 = | 10 ohms nominal - is adjustable |
| R16 = | 10 ohms |
| R17 = | 301 ohms |
| R18 = | 1000 ohms |
| R19 = | 20 ohms |
| L1 = | 1 millihenry |
| C2 = | 200 microfarads |
| C3 = | 6.8 microfarads |

In the description of circuit 34 it was stated that the reference current is set to a value which for the typical component values listed previously is 1/100th of the desired drop current. In circuit 36 this reference current flows through resistor R18 while the actual drop current flows through resistor R18 while the actual drop current flows through resistor R16. The typical component values for resistors R18 and R16 are selected such that the ratio of the resistance of the two resistors is 100 to 1. As the reference current is 1/100th of the desired drop current and as the switching regulator circuit 36 will cause the drop current to be equal to 100 times the true reference current the voltage developed across resistor R18 by the reference current will equal the voltage developed across resistor R16 by the drop current. In this manner the voltages at the inverting and noninverting inputs of comparator 44 will be made equal to each other.

Assume now that additional subscribers connected to terminal 14 come off hook. The load on the terminal increases thereby reducing the voltage on the cable pairs at the terminal's input. When the input voltage falls below the predetermined reference voltage, circuit 34 as described previously generates a new reference current signal which appears at the non-inverting input to comparator 44. This signal is such as to cause the current flowing in each of the loops of the off hook subscribers to change from the previous amplitude of 23 milliamperes to some lower amplitude which is sufficient to decrease the load on the subscriber terminal and bring the line voltage at the terminal 14 back to the predetermined reference.

Circuit 36 also includes the contacts of a ringing relay designated as $RY_1$ in FIG. 4. Ringing voltage is supplied by the power supply located at terminal 14 and is applied to the subscriber's telephone through a resistor (not shown), relay $RY_1$, and a primary winding of transformer T1 to the ring conductor of the subscriber's drop loop. A ringing command transmitted from the central office causes the contacts of relay $RY_1$ to operate so as to disconnect the switching regulator from the tip and ring conductors of the subscriber's loop during ringing. It should be appreciated that when a ringing voltage is applied to the subscribers telephone there is no need to provide drop current during that interval of time.

A further appreciation of the manner in which the switching regulator contained in the subscriber drop circuitry of the present invention functions may be obtained from the example given below. Assume only one subscriber is off hook. Conventional drop circuitry would supply the subscriber a loop current of 23 ma which is drawn from the $-27$ volts. In other words for the conventional drop the subscriber loop would assume $(27) \times (23 \times 10^{-3})$ or 0.621 watts of power.

Assume further that the subscriber is connected to the terminal by a loop such that the total resistance of the loop includes the resistance of resistors R15 and R16 and transformer T1 (FIG. 4) as well as the resistance of the drop wires and the subscribers phone. Assume further that this total resistance is 400 ohms. If the switching regulator of FIG. 4 were used in place of the conventional drop circuitry then the subscriber loop would consume only $(23 \times 10^{-3})^2 (400)$ or 0.211 watts. The switching regulator adjusts its conduction time as a function of the loop length (that is loop resistance) to accomplish this result. Conventional drop circuitry cannot adjust its output to supply only the power required by the loop length. For the 400 ohm loop the use of conventional drop circuitry results in the waste of 0.41 (0.621–0.211) watts of power. A subscriber terminal powered from the central office has only a limited amount of power available and cannot afford to use these watts unwisely. Thus the switching regulator of the present invention allows the use of the limited power available from the central office to be maximized.

The switching regulator of the present invention also allows the subscriber to be connected to terminal 14 by very long loops without using excessive power on short loops. The longest loop in terms of total loop resistance by which a subscriber may be connected to terminal 14 can be determined as follows. A conventional drop circuit supplies 0.621 watts of power. The switching regulator supplies power which is the product of the square of the drop current and the loop resistance. The 0.621 watts of power supplied by the conventional circuit could if a switching regulator were used power a loop having a total resistance of (0.621) divided by $(23 \times 10^{-3})^2$ or 1174 ohms. Thus the use of a switching regulator allows some of the subscribers of the system to be located quite far from terminal 14 and still have the associated telephone powered over the cable pairs from the central office.

A further appreciation of the manner in which the circuitry for reducing drop current when the cable pair voltage at the terminal falls below the voltage which allows maximum power transfer from the cable pairs to the terminal may be obtained as follows. In conventional drop circuitry when the load on the system increases such that the cable pair voltage decreases as described above power supplies in the terminal function to regulate the input voltage to keep it at the predetermined voltage. This regulation is accomplished by reducing the output voltage generated by the supply. As the drop voltage placed across the tip and ring terminals of each of the subscriber drops is one of the regulated voltages, this voltage is also reduced. This reduction of drop voltage in turn reduces the drop current in each loop as a function of loop length. The reduction in drop current is greater for long loops than for short loops thereby penalizing the subscribers connected to the long loops. Service to these subscribers may become degraded to the point where their associated telephones are not usable yet a short loop subscriber may still have service. Reduction of the output voltages of the regulated terminal supply also has the detrimental effect of reducing the voltage supplied to the electronics contained in the terminal. Thus voltages such as bias voltages for transistors or integrated circuit chips which are ordinarily closely regulated to some predetermined amplitude will be reduced ensuring that at some point these components will cease to properly function.

The circuitry of the present invention which reduces the drop current when the voltage at the terminal input falls below a predetermined amplitude do so uniformly for all of the off hook subscribers serviced by drop current reference circuit 34. Each off hook subscriber has its associated drop current reduced by the same amount independent of loop length. Long loop and short loop subscribers are treated equally. The drop voltage and other of the voltages in the terminal are maintained at their regulated value. It has been found that the drop current may be reduced well below the normal level of 23 ma before the subscriber notices any appreciable degradation in phone service. Thus the above circuitry allows under the high load condition described above all of the off hook subscribers to be treated equally and their service to be lessened in a predetermined uniform manner.

When the circuitry described above is combined with the switching regulator subscriber drop circuitry described previously, the two combine to allow the drop current to be reduced with a substantial decrease in power loss. This combinatorial effect may be appreciated from the following examples.

Assume an off hook subscriber is located on a loop having a total resistance of 1174 ohms. When the drop current is at its normal value of 23 ma the power consumed by the loop is as determined previously 0.621 watts. Assume further that the system load increases such that circuits 32 and 34 require the drop current to be reduced to 15 ma. Without the switching regulator the power consumed by the loop would be $(15 \times 10^{-3})$ (27) or 0.405 watts. With the switching regulator the power consumed by the loop is $(15 \times 10^{-3})^2 (1174)$ or 0.264 watts. The combinatorial effect of circuits 32, 34 and 36 results in the savings of approximately 0.140 watts to this subscriber. These calculations disregard the small degree of inefficiency associated with the switching regulator.

As a second example assume an off hook subscriber is located on a loop which has a total resistance of 400 ohms. When the system load increases thereby requiring the drop current to be reduced to 15 ma, for example, the power consumed by the loop is as determined previously 0.405 watts if a switching regulator is not used. If the switching regulator is used in combination with the circuitry for reducing drop current with load the power consumed by the loop is $(15 \times 10^{-3})^2 (400)$ or 0.09 watts. The use of the swtiching regulator represents a savings of approximately 0.3 watts for this subscriber. Once again the small degree of inefficiency associated with the switching regulator has been disregarded.

It should be appreciated that the circuitry of the present invention may be divided into two distinct circuit units each of which alone provide a function which substantially improves the operation of the subscriber drop circuitry when compared to conventional drop circuits. One of these functions is uniform and equal decrease in drop current for all off hook subscribers when the terminal input voltage falls below some predetermined voltage. The other of these functions is a switching regulator for generating subscriber drop current which operates as a function of subscriber drop loop length to control the power required by each subscriber. Each of these functions operating alone allows the power available at the terminal in a central office powered system to be used efficiently and service to be maintained to all subscribers on an equal basis. A subscriber drop circuit combining these two functions allows the most efficient use of the limited power available at the terminal where it is necessary to reduce drop current equally to all off hook subscribers.

Circuit 34 may then be used to provide drop current without the use of switching regulator 36. In such a situation the reduction in drop current when the terminal input voltage falls below the predetermined reference voltage may be accomplished by varying the voltage on each of the bases of the transistors comprising the current mirror circuits 38, 40 of FIG. 3.

While error amplifier circuit 32 has been described as determining when the voltage on the cable pairs falls below a predetermined voltage to thereby cause circuit 34 to reduce the drop current and maintain the two voltages equal, circuit 32 could also respond to the current on the cable pairs at the terminal input and determine when that current rises above a reference such that the drop current is reduced to that value which keeps the input current at the value which provides maximum power transfer.

It should finally be appreciated the present invention may be used in any telecommunications system wherein a terminal located remote from a central office serves a multiplicity of subscribers and the terminal is powered from the central office. Such systems may include both digital and analog subscriber carrier systems, remote switches, concentrators and any other equipment which meets the requirement described above.

It is to be understood that the descriptions of the preferred embodiments are intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. A circuit for use in the remote terminal of a central office powered multi-subscriber telecommunications system for generating a drop current proportional to a predetermined reference current to a subscriber connected to said terminal by a drop loop of predetermined length to thereby control the power consumed by said subscriber as a function of said loop length said circuit comprising:
   (a) switching means having a controllable conduction time for generating said drop current;
   (b) means for generating a voltage proportional to said drop current;
   (c) means for generating a voltage proportional to said reference current; and
   (d) means responsive to said drop current proportional voltage and said reference current proportional voltage for controlling said conduction time of said switching means such that said drop current proportional voltage is made substantially equal to said reference current proportional voltage whereby the power consumed by said subscriber is controlled as a function of said loop length.

2. The circuit of claim 1 wherein said conduction time controlling means includes comparator means for comparing said drop current proportional voltage to said reference current proportional voltage.

3. The circuit of claim 2 wherein said comparator means generates a first output signal when said drop current proportional voltage exceeds said reference current proportional voltage and a second output signal when said reference current proportional voltage exceeds said drop current proportional voltage.

4. The circuit of claim 3 wherein said switching means turns off in response to said comparator means first output signal and turns on in response to said comparator means second output signal for generating said drop current.

5. The circuit of claim 1 wherein said means for generating said drop current proportional voltage is a first resistor and said means for generating said reference current proportional voltage is a second resistor.

6. The circuit of claim 5 wherein said predetermined reference current has a magnitude which is a predetermined fraction of the magnitude of said drop current and wherein said first resistor has a resistance which is said predetermined fraction of the resistance of said second resistor.

7. The circuit of claim 4 wherein said switching means is a transistor whose base is connected to receive said comparator means first and second output signals.

8. A circuit for use in the remote terminal of a central office powered multi-subscriber telecommunications system for generating a drop current proportional to a predetermined reference current to a subscriber connected to said terminal by a drop loop of predetermined length to thereby control the power consumed by said subscriber as a function of said loop length said circuit comprising:
   (a) comparator means for comparing a first signal of predetermined frequency and amplitude and having a predetermined periodic waveform and a d-c level determined by said drop current to a signal proportional to said reference current said comparator generating a first output signal whenever said first signal exceeds said reference signal and a second output signal whenever said reference signal exceeds said first signal; and
   (b) switching means responsive to said comparator means output signals said switching means being turned off in response to said first output signal and being turned on in response to said second output signal for generating said drop current proportional to said reference current whereby the power consumed by said subscriber is controlled as a function of said loop length.

9. The circuit of claim 8 wherein said comparator means includes first means for generating said d-c level determined by said drop current and second means for generating said signal proportional to said reference current.

10. The circuit of claim 9 wherein said first and second means are first and second resistors, respectively.

11. The circuit of claim 10 wherein said signal proportional to said reference current has a magnitude which is a predetermined fraction of the magnitude of said d-c level and wherein said first resistor has a resistance which is said predetermined fraction of the resistance of said second resistor.

12. The circuit of claim 8 wherein said predetermined periodic waveform of said first signal is triangular in shape.

13. The circuit of claim 8 wherein said switching means is a transistor whose base is connected to receive said comparator means first and second output signals.

14. The circuit of claim 11 wherein said comparator means has two inputs and wherein both said signal proportional to said reference current and said d-c level are voltages one of said voltages being connected to one of said inputs and the other of said voltage being connected to the other of said inputs said comparator means output signals controlling the turning on and turning off of said switching means so that said voltages are made substantially equal to each other.

15. A circuit for use in the remote terminal of a multisubscriber telecommunications system wherein a central office supplies a signal on the transmission means connecting said terminal to said office for the purposes of transferring power from said central office to said terminal, said terminal serving at least one of said subscribers connected thereto by a drop loop, said circuit for generating and controlling as a function of system load the drop current to said at least one subscriber, said circuit comprising:
  (a) means responsive to said power transferring signal received at said terminal with an amplitude dependent on said system load and to a reference signal having an amplitude representing a predetermined value of said power transferring signal for generating an error signal having an amplitude which is a function of the amount by which said power transferring signal deviates in a predetermined direction from said reference signal; and
  (b) drop current generating means for generating a predetermined value of drop current to said at least one subscriber and responsive to said error signal for decreasing said current by an amount which maintains the amplitude of said power transferring signal substantially equal to the amplitude of said reference signal.

16. The circuit of claim 15 wherein said error signal generating means includes:
  (a) means for generating a signal proportional to said power transferring signal; and
  (b) high gain operational amplifier means responsive to said proportional signal and said reference signal for generating said error signal.

17. The circuit of claim 15 wherein said drop current generating means includes:
  (a) means for generating a reference current, said current having a first amplitude when said error signal amplitude is zero and a second amplitude which decreases in a predetermined fashion as the amplitude of said error signal increases; and
  (b) switching regulator supply means responsive to both a voltage proportional to said reference current and a voltage proportional to said drop current for generating said drop current, said drop current having said predetermined value when said reference current has said first amplitude and a decreasing value proportional to said reference current second amplitude when said reference current has said second amplitude.

18. The circuit of claim 17 wherein said switching regulator supply means includes:
  (a) switching means having a controllable conduction time for generating said drop current; and
  (b) means responsive to said drop current proportional voltage and said reference current proportional voltage for controlling said conduction time of said switching such that said drop current proportional voltage is made substantially equal to said reference current proportional voltage.

19. The circuit of claim 15 wherein said drop current generating means includes:
  (a) first means for generating a signal proportional to a reference current said current having a first amplitude when said error signal amplitude is zero and a second amplitude which decreases in a predetermined fashion as the amplitude of said error signal increases; and
  (b) second means for generating a signal of predetermined frequency and amplitude and having a predetermined periodic waveform and a d-c level determined by said drop current; and
  (c) switching regulator supply means responsive to said signal proportional to said reference current and to said second means signal for generating said drop current, said drop current having said predetermined value when said reference current has said first amplitude and a decreasing value proportional to said reference current second amplitude when said reference current has said second amplitude.

20. The circuit of claim 19 wherein said switching regulator supply means includes:
  (a) comparator means for comparing said second means signal to said reference current proportional signal said comparator means generating a first output signal whenever said second means signal exceeds said reference current proportional signal and a second output signal whenever said reference current proportional signal exceeds said second means signal; and
  (b) switching means responsive to said comparator means output signals said switching means being turned off in response to said first signal and being turned on in response to said second signal for generating said drop current proportional to said reference current.

* * * * *